June 22, 1926.
J. B. FREYSINGER
AUTOMOBILE DOOR HANDLE
Filed June 1, 1925
1,589,525
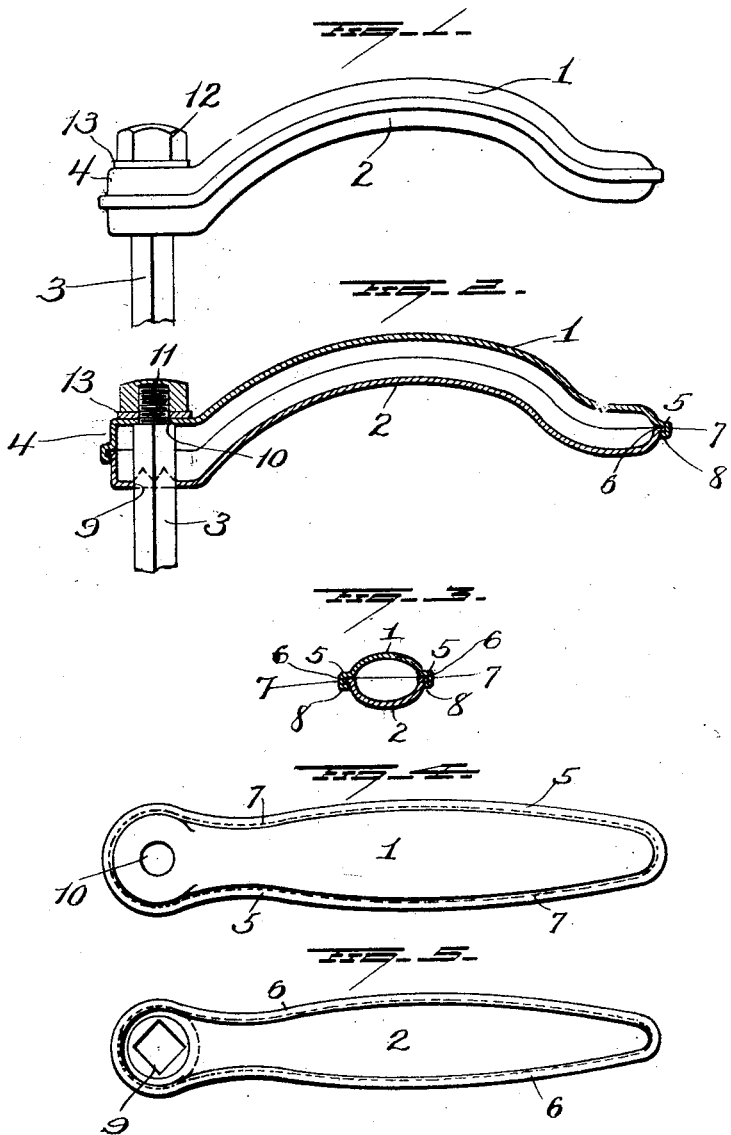

Patented June 22, 1926.

1,589,525

UNITED STATES PATENT OFFICE.

JOHN B. FREYSINGER, OF NEW BRITAIN, CONNECTICUT, ASSIGNOR TO NORTH & JUDD MANUFACTURING COMPANY, OF NEW BRITAIN, CONNECTICUT.

AUTOMOBILE DOOR HANDLE.

Application filed June 1, 1925. Serial No. 34,128.

This invention relates to improvements in handles and has particular reference to inside handles for automobile doors.

One object of the invention is to provide a simple and efficient automobile door handle which may be made in two parts of sheet metal firmly united, and which shall be substantial in structure so as to be capable of withstanding all strains to which it may be subjected.

A further object is to provide a hollow, sheet metal handle which shall combine lightness and rigidity and which may be economically manufactured.

With these and other objects in view, the invention consists in certain features as hereinafter set forth and pointed out in the claim.

In the accompanying drawings,—

Figure 1 is a side elevation illustrating a handle embodying my improvements.

Figure 2 is a longitudinal sectional view with the spindle in elevation.

Figure 3 is a transverse sectional view.

Figure 4 is a view of the top member of the handle, and

Figure 5 is a view of the bottom member.

My improved handle comprises two sheet metal members 1 and 2 which, when united, form an elongated handle having a general arch-shape with its free end portion approximately at right angles to the spindle 3 with which the opposite straight end portion 4 is connected.

The sheet metal members 1 and 2 are made convex in cross section so that when they are united, the handle will be hollow. The top member 1 is provided with a lateral flange or flanges 5 extending around the edge portion of said member and the lower member 2 is provided around its edge with a lateral flange 6 to seat against the flanged edge portion of the member 1, as shown in Figure 3. The flange 5 extending around the edge of the member 1 is made of greater width than the flange 6 of the member 2 and is bent downwardly as at 7 and then inwardly to form a lip 8, Figure 3, projecting under the flange 6 around the edge of the member 2. The two members are thus firmly united and the flanged portion of the upper member provides in effect a bead extending around the handle and serving to reinforce or strengthen the same. The inner end portion of the lower member 2 of the handle is made with an angular opening 9 for the accommodation of the spindle 3 and opposite this opening, the upper member 1 of the handle is made with a hole 10 through which the threaded shank 11 of the spindle passes. This shank receives a nut 12 and between the latter and the inner end portion of the upper member 1, a disk or washer 13 may be located.

Having fully described my invention what I claim as new and desire to secure by Letters-Patent, is:

A door handle consisting of two similar mating transversely curved members permanently united by interlocking flanges through the entire extent of their edges, one of said members having a non-circular opening through its web adjacent one end to receive and fit around a spindle of like cross section whereby movement of the handle will turn the spindle and the other member having an opening through its web axially alined with the first-mentioned opening and of less area whereby said member may be fitted on a reduced end of the spindle and clamped against a shoulder on the spindle.

In testimony whereof, I have signed this specification.

JOHN B. FREYSINGER.